Dec. 15, 1925. 1,565,802
V. G. HUSH ET AL
WINDSHIELD CLEANER
Filed Nov. 22, 1920
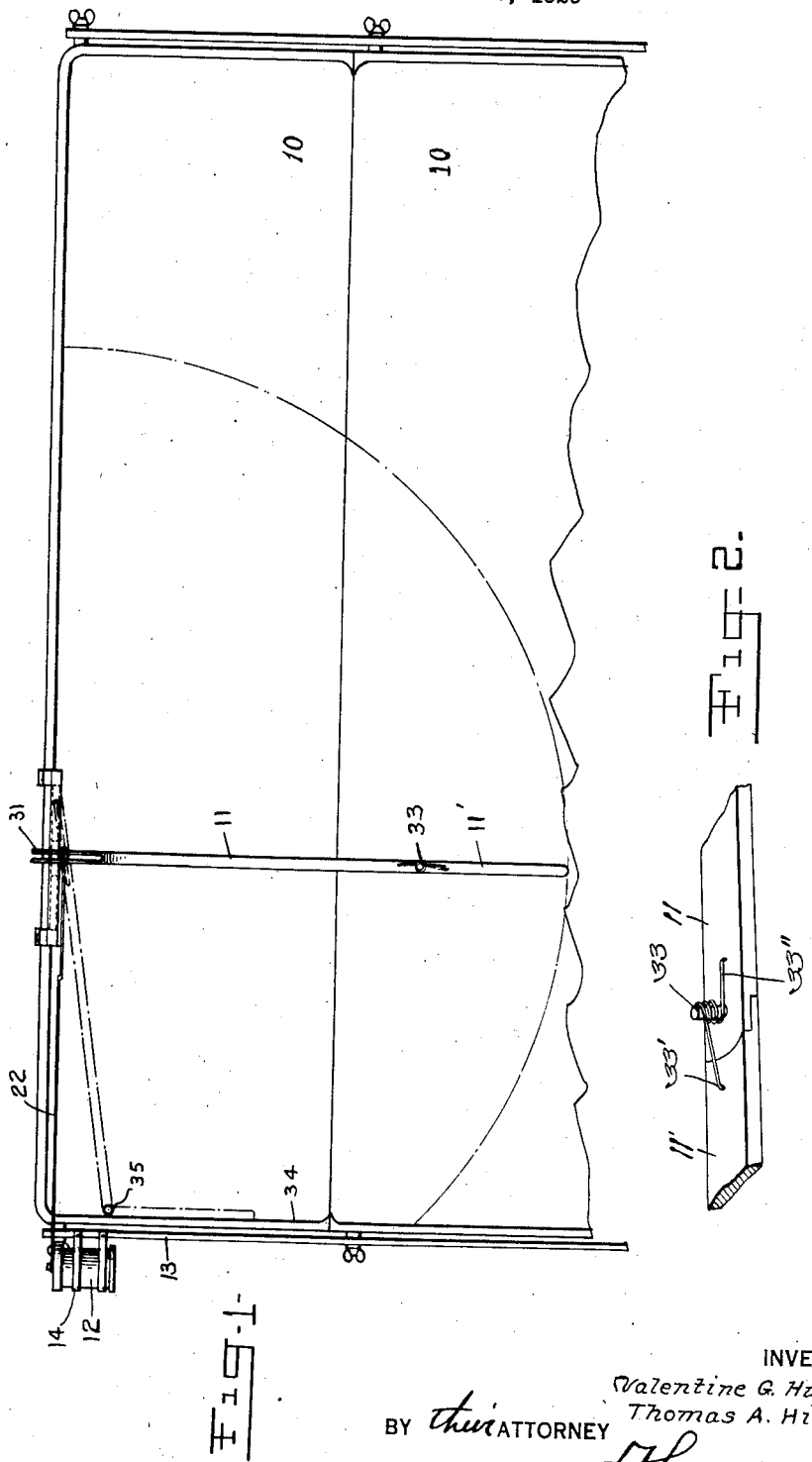
INVENTOR
Valentine G. Hush.
Thomas A. Hill.
BY their ATTORNEY Patented Dec. 15, 1925.

1,565,802

UNITED STATES PATENT OFFICE.

VALENTINE G. HUSH, OF NEW YORK, AND THOMAS A. HILL, OF BROOKLYN, NEW YORK; SAID HILL ASSIGNOR TO SAID HUSH.

WINDSHIELD CLEANER.

Application filed November 22, 1920. Serial No. 425,595.

*To all whom it may concern:*

Be it known that VALENTINE G. HUSH and THOMAS A. HILL, citizens of the United States, residing at New York city, county of New York, and Brooklyn, respectively, in the county of Kings and State of New York, have invented certain new and useful Improvements in Windshield Cleaners, of which the following is a specification, reference being had therein to the accompanying drawing.

Our invention relates to improvements in windshield cleaners, and more particularly as refers to a special form of wiper adapted to be driven over the shield by a motor or the like.

In the accompanying drawings Figure 1 is a vertical elevation partly broken away showing a windshield with the attachment thereon; and, Figure 2 is a detail view of the hinge connection between the sections of the wiper arm.

Referring now more particularly to the drawings 10 indicates the shield and 11—11' the sections of the wiper or cleaner. 12 indicates a suitable form of electric motor which may be attached to the uprights 13 by any suitable means such as straps 14.

When the current is turned on the motor 12, the lever 22 is oscillated, which lever in turn engages the bifurcated end 31 of the upper cleaner section 11, which section is pivotally suspended on the windshield or a bracket therefor in any suitable manner. During the operation of the motor the wiper or cleaner sections 11 and 11' oscillate pendulumwise across the windshield as indicated in dotted lines Figure 1. The wiper is formed of two sections, the sections being united by a pivot 33 having disposed thereon a coil spring provided with extended arms 33' and 33", one arm being connected with the section 11 and the other with the section 11'. This spring normally serves to maintain the sections in actual alignment, but upon striking the side of the frame 34 of the windshield the lower section 11' bends as shown in dotted lines at 33, decreasing the area actually cleaned. In other words, it is clear that one section can be moved relative to the other, but that during the normal oscillation of the cleaner the sections are maintained in actual alignment through the spring mounted on the pivot pin 33.

We claim:

A windshield cleaner comprising a wiper arm, means for swingingly mounting the wiper arm on the windshield with the wiper arm in contact with the windshield glass, and means for actuating said wiper arm, said wiper arm including an inner section adapted to be swingingly mounted on the windshield, and an outer section hinged to the free end of the inner section, resilient means cooperating with said sections to retain them normally in alignment.

In testimony whereof we hereunto affix our signatures.

VALENTINE G. HUSH.
THOMAS A. HILL.